Figure 1:
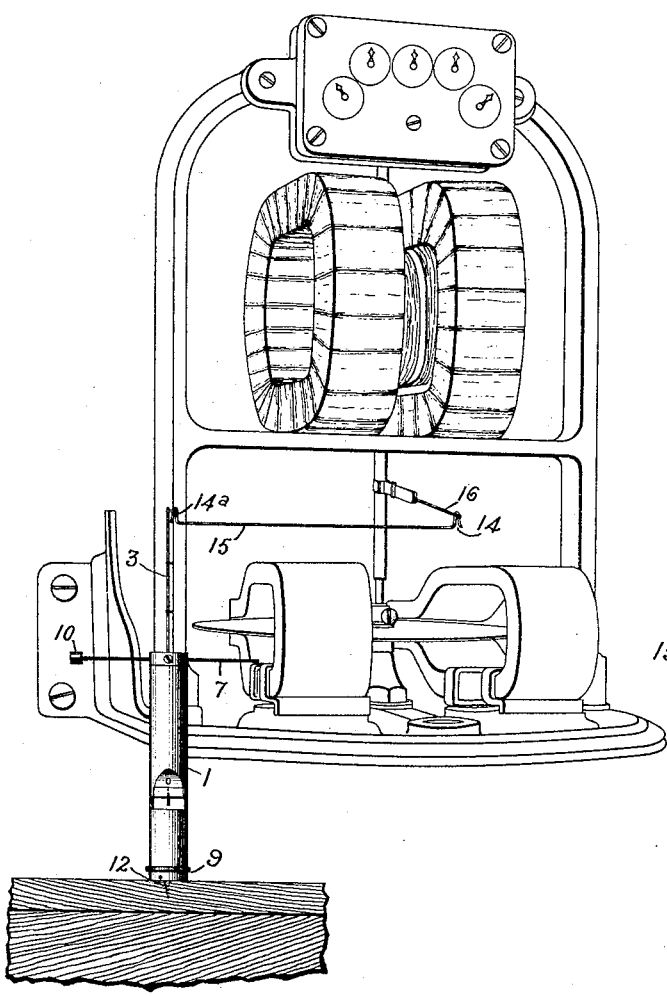

No. 771,302. PATENTED OCT. 4, 1904.
A. LE R. ELLIS.
TORQUE TESTING DEVICE.
APPLICATION FILED MAR. 13, 1903.
NO MODEL.

Witnesses.
George H. Tilden
Helen Orford

Inventor.
Alvarado L. R. Ellis.
by Albert H. Graves
Att'y.

No. 771,302.

Patented October 4, 1904.

UNITED STATES PATENT OFFICE.

ALVARADO LE ROY ELLIS, OF SWAMPSCOTT, MASSACHUSETTS, ASSIGNOR TO GENERAL ELECTRIC COMPANY, A CORPORATION OF NEW YORK.

TORQUE-TESTING DEVICE.

SPECIFICATION forming part of Letters Patent No. 771,302, dated October 4, 1904.

Application filed March 13, 1903. Serial No. 147,557. (No model.)

*To all whom it may concern:*

Be it known that I, ALVARADO LE ROY ELLIS, a citizen of the United States, residing at Swampscott, in the county of Essex, State of Massachusetts, have invented certain new and useful Improvements in Torque-Testing Devices, of which the following is a specification.

This invention relates to torque-testing devices for electric meters.

The object of the invention is to provide a portable instrument sufficiently sensitive for accurate measurement of the torque of that type of electric meters in which a meter-motor is employed.

Under present practice in the distribution of energy managers of electric lighting or power systems must rely upon the representations of the manufacturer as to the efficiency of the operating mechanism in their recording instruments—for example, the recording-wattmeters employed at the central station and on the consumer's premises. The apparatus is not always efficient, and considerable power is wasted of which the management is not aware.

It is the object of this invention to provide a small portable device capable of indicating the efficiency of the meter mechanism. The device comprises a dynamo-meter of simple construction in which the operative parts are normally housed in a cylindrical tube of small compass and which may be carried conveniently in the pocket or placed in a desk. The device comprises an attachment by which it may be readily mounted upon or secured to a wooden frame or table adjacent to the meter, this attachment being normally stowed away within the instrument-casing.

The preferred embodiment of the invention comprises a gravity construction in order to insure reliability and permanency. The construction comprises a pivoted balance-arm capable of folding axially of the casing to admit of compact housing of the parts when the device is not in service. It comprises also a pivoted index-lever coöperating with the balance-arm mounted on the same axis, but independently journaled thereon and interlocking with the balance-arm when the parts are in position for service. The index-lever has a depending weighted arm acting as a counterbalance, on the end of which is mounted a pointer overhanging a reference-plate suitably marked on the side of the casing. A number of light wire parts are provided to facilitate attachment to the meter-shaft. One of these is provided with a clip for clamping it to the meter-shaft and the other with hooks for entering eyelets or the like on the several parts and forming a connecting-link between the meter-shaft and the balance. A number of different weights are provided to enlarge the testing capacity of the instrument, these weights being normally stowed in the plug or cap which constitutes the attaching device. The index-lever and crank-rod are provided with sockets or eyelets at a plurality of points into any pair of which the connecting-link may be inserted. Thus if, as in the type shown in the drawings, the crank-arm is provided with four eyelets and the index-lever with three and two weights of different value are furnished the instrument will be provided with a range of three times four times two or twenty-four times its minimum torque-measuring capacity. This is sufficient to accommodate a wide range of meter torque.

The novel features of my invention will be more fully hereinafter described and will be definitely pointed out in the claims.

Figure 2:
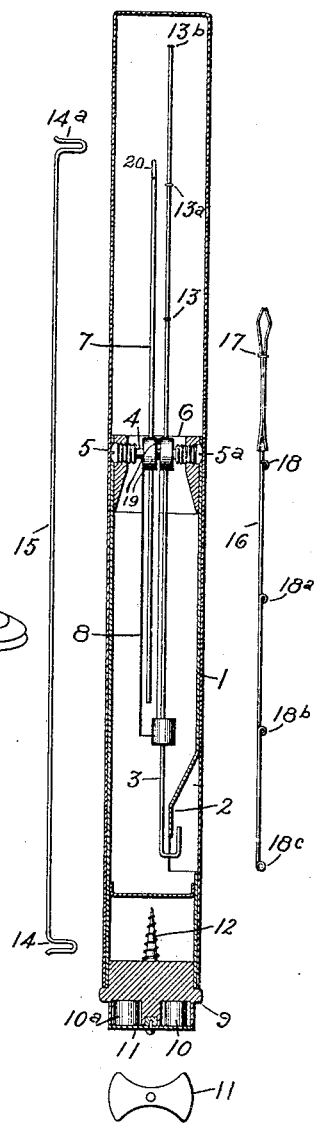

In the accompanying drawings, Figure 1 is a partial perspective view of a Thomson recording-wattmeter, showing one of the torque-measuring devices mounted in operative relation to the instrument; and Fig. 2 is a sectional view of the measuring instrument with its cover in place, the crank-arm and connecting-link being shown outside of the casing.

1 represents a cylindrical casing or shell of drawn tubing, in the side of which a recess, as indicated at 2, is formed, partially closed with a wall or partition, as indicated, to permit a bent pointer to show from the front. This index is formed on the end of the weighted arm 3 of the index-lever, secured to a shaft 4, trunnioned in set-screws 5 5$^a$, mounted in a reinforcing-tube 6 in the upper part of the casing. A balance-arm 7 is pivoted on the same shaft, but loosely mounted, the hubs on which the index-lever and balance-arm are mounted being provided with studs or pins 19, which interlock when the instrument is set in the position shown in Fig. 1, so that the two arms move together. Normally the arms 3 and 7 are folded to lie parallel with the axis of the shell; but the arm 7 may be turned at right angles to this position, the lower end passing out of the shell through a slot 8. The bottom of the shell is closed by a plug 9, counterbored on its lower end to provide receptacles for the weights 10 $10^a$, a pivoted plate 11 of the shape indicated in the attached view, Fig. 2, permitting the weights to be withdrawn when needed. The upper end of the plug is provided with a wood-screw 12. Either end of the plug is adapted to fit into the end of the tube. Normally it is set in the position indicated in Fig. 2, so that the instrument has a neat finish and the screw is inclosed within the casing. When in service, however, the milled edge of the plug permits it to be withdrawn and reversed, as indicated in Fig. 1, where it is in position for use. When the cover is removed from the instrument, the upper end of the index-arm 3 projects, as will be understood from Fig. 1. This is provided at different parts of its length and at uniform distances apart with eyelets 13 $13^a$ $13^b$, adapted to accommodate a hook 14 $14^a$ on the end of the wire link 15.

16 represents a crank adapted to be clamped to the meter-shaft. At its end it is provided with two spring-jaws to inclose the meter-shaft and a sliding collar 17 to secure it friction-tight to the shaft. This crank is provided with eyelets 18 $18^a$ $18^b$ $18^c$ at different parts of its length.

The two weights may be made of any desired metal; but in practice one is of brass and the other of aluminium, weighing one gram and one quarter of a gram, respectively.

In using the instrument the base-piece is reversed and screwed into a soft-wood support and the cylinder placed upon the fixed piece in vertical position. The balance-arms are turned so that they will be at right angles to each other. The crank-arm is attached by the clamp to the meter-shaft, and one hook of the connecting-link is inserted into one of the eyelets of the crank-arm and the other into one of the eyelets on the indicator-arm. With no load on the meter the link should be approximately horizontal and at right angles with the index-arm. This adjustment should be as nearly correct as can be judged by the eye. The balance is leveled so that the index stands at the zero-mark on the reference-plate in the side of the instrument. One of the weights, according to the torque of the meter being tested, is placed on the end of the balance-arm, the end of which is slightly reduced to permit the weight to be slipped over it until arrested by a shoulder 20 at the proper position. To make the measurement, a load is put on the meter so that the pointer is brought back to the zero-mark and the dimensions of the load in watts, as well as the value of the weight and the length of the arms, noted. The torque or turning moment is defined in gram millimeter units—that is to say, a torque produced by one gram acting at the end of an arm one millimeter long. If the brass weight which weighs one gram be placed on the balance-arm, being at a distance of fifty millimeters from its point of suspension, it will give a resultant torque of fifty gram millimeters. Against this is balanced the torque of the meter acting through the crank-arm and through the upper limb of the index-lever. Assuming that we have a meter whose rating is ten amperes and one hundred and ten volts and that we have the link in eyelet 2 of the crank and eyelet 3 of the index-lever and that the brass weight is used and that the amount of load required to bring the pointer to the zero-mark as measured by the amperes multiplied by the volts or by a watt-indicator is seven hundred and forty-five watts, then the full-load torque equals $2 \times 50 \times 1\,100$ divided by $3 \times 745$, equals 49.3 gram millimeters, eleven hundred being, as assumed, the full load of the meter. With meters of less torque the link would be connected at a point closer to the meter-shaft on the crank-arm. With meters of greater torque the point of connection may be shifted farther out on the crank-arm or toward the hub on the index-arm. With meters of still less torque the aluminium weight may be used. After the test has been made the balance-arms may be folded axially of the tubular support and the loose parts 15 and 16 inserted and the casing applied.

What I claim as new, and desire to secure by Letters Patent of the United States, is—

1. A torque-balance comprising a support, a pivoted indicator, a balance adapted to be shifted into a position of parallelism with or at right angles to the indicator, and means for connecting the indicator with the device to be tested.

2. A torque-testing device comprising a tubular support, a pivoted index mounted therein, a weighted lever adapted to be turned at an angle to the index, a crank adapted to be attached to the shaft of the device to be tested, and a link connecting the crank and said index.

3. A torque-testing device comprising a tubular support having a reference-plate in its side and an index playing over the same, an index-lever and balance-arm journaled on the end of the tubular support and adapted to be folded along its axis, means for connecting the lever with a device to be tested, and a cover for the end of the support.

4. A torque-testing device comprising a hollow support having a reference-plate thereon, a pivoted index-lever and balance-arm adapted to be folded in substantial parallelism with its axis, and a reversible end-piece-carrying means for securing the support to a base.

5. A torque-testing device comprising a hollow support, an index-lever and balance-arm pivoted at one end thereof, a crank for the shaft to be tested, a connecting device for the index-lever and crank, and means permitting variation of the points of connection.

6. A torque-testing device for meters comprising a balance having a pivoted index-lever and means for biasing the same against displacement, a crank to connect the same with a meter, and a clamp to secure the crank to the meter-shaft.

7. A torque-testing device comprising a hollow standard adapted to be supported in a vertical position, a pivoted index mounted thereon, a member with which the index coöperates having a reference-mark thereon, a folding balance-arm, and a crank and clamp for connecting with a vertical shaft.

8. A torque-testing device comprising a casing, pivoted index and balance arms adapted to fold parallel with one another, a crank, a connecting device, and means permitting variation of the points of connection of the latter to vary the range of the instrument.

In witness whereof I have hereunto set my hand this 9th day of March, 1903.

ALVARADO LE ROY ELLIS.

Witnesses:
DUGALD McK. McKILLOP,
JOHN A. McMANUS.